No. 631,741. Patented Aug. 22, 1899.
H. FRIEDRICH.
DEVICE FOR REGULATING PRESSURE AND QUANTITY OF FLUIDS.
(Application filed June 27, 1899.)
(No Model.)
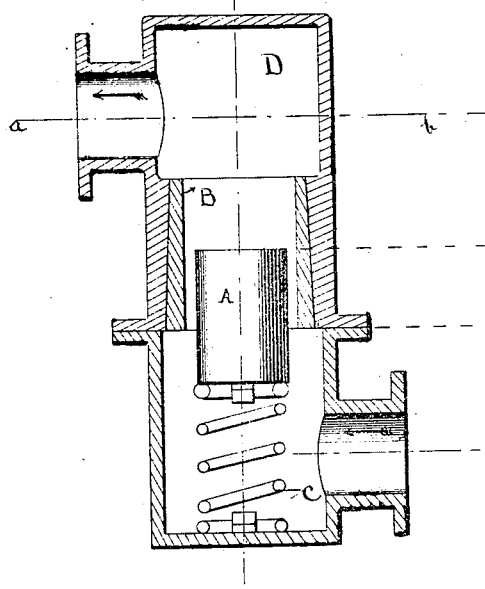
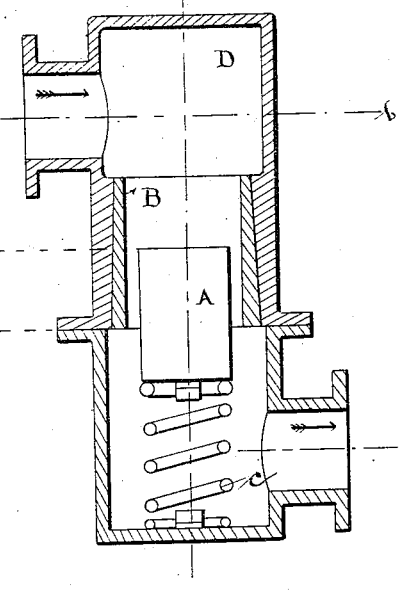
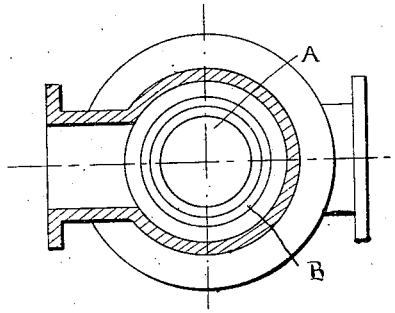
Witnesses
W. Hill
Robert Voss
Inventor
Hans Friedrich
By his Attorney J. Dithmar

UNITED STATES PATENT OFFICE.

HANS FRIEDRICH, OF MITTWEIDA, GERMANY.

DEVICE FOR REGULATING PRESSURE AND QUANTITY OF FLUIDS.

SPECIFICATION forming part of Letters Patent No. 631,741, dated August 22, 1899.

Application filed June 27, 1899. Serial No. 722,041. (No model.)

*To all whom it may concern:*

Be it known that I, HANS FRIEDRICH, a subject of the Emperor of Germany, residing at Mittweida, Germany, have invented certain new and useful Improvements in Devices for Regulating the Pressure and Quantity of Fluids; and I do hereby declare the following to be a full, clear, and exact description of the invention, such as will enable others skilled in the art to which it appertains to make and use the same.

The present invention relates to pressure-regulating devices and the like; and its object is to provide a novel means or device for regulating the pressure and quantity of fluids and to render such device simple in construction and absolutely reliable in operation.

It consists in the novel construction, arrangement, and combination of the parts of a regulating device, as presently described, and particularly pointed out in the claim.

In the accompanying drawings, which form a part of this specification, Figure 1 is a central vertical section of a pressure and quantity regulator embodying my invention, with the inlet arranged to direct the flow upwardly against the regulating device. Fig. 2 is a similar view, but with the inlet arranged to direct the flow upon the top of the regulating device. Fig. 3 is a transverse section of the device.

The chief parts of the regulator are the braking-piston A, the internal ferrule or braking-tube B, and the pressure-receiver or pressure-compensating device C; also, the casing D, with inlet and outlet.

The braking-piston A is in general a prismatic body of any desired cross-section—that is, solid or hollow, broken or closed, with smooth, grooved, or edged surfaces.

The braking-tube B surrounds the braking-body in such a manner that in each position of the braking-piston the fluid-passage, which may, as preferred, be single or multiple and of any shape, will remain constant.

The braking-piston and braking-tube form the regulating-body, of which one of the parts is stationary and the other movable, or both are movable against each other.

The necessary length L in which the braking-piston protrudes into the braking-tube is called the "braking" length.

The pressure-receiver or pressure-equalizer C consists of any spring or weight which compensates the change in the length of braking and which is connected to the movable part of the regulating-body. It serves to take up the difference in pressure on the movable part of the regulating-body and to equalize it as far as is necessary.

The casing D contains the different parts and is provided with inlet and outlet.

In the inlet and outlet space there is a difference in pressure on account of the inserted resistance, whereby a force is produced, which effects the displacement of the movable part of the regulating-body. This is transmitted to the pressure-receiver. If the piston were fixed, an increase in the difference of pressure would produce an increase in the quantity of fluid passing through, and vice versa.

The device, Fig. 1, acts in such a manner that according to the action of the pressure-receiver the length of braking increases with an additional difference in pressure, and vice versa. Thus the influence in the variation of pressure is equalized on the quantity of fluid in such a manner that the quantity of fluid passing, according to the position of the piston and the pressure-receiver, is more or less constant.

In the construction shown in Fig. 2 the braking length of the action of the pressure-receiver decreases in proportion to the additional increase in pressure, and vice versa. The quantity of fluid passing is therefore dependent on the change in the difference of pressure in an increased degree, as in stationary pistons similar changes of the difference in pressure would only cause less changes in the quantity of the fluid passing through than with a yielding piston.

Having thus described my invention, what I claim as new, and desire to secure by Letters Patent of the United States, is—

In an interchangeable pressure-regulating device for fluids, a valve-chamber D with two diagonally-opposite ports, a fast internal ferrule B of cone shape, midway of said ports, a cylindrical piston A longitudinally movable in said ferrule, said piston adapted to receive the direct impact of a passing fluid medium, and forming a space between itself and the ferrule the size of which space is regulated by the position of the piston, and a coiled spring interposed between and fastened to said piston and an end extremity of the valve-chamber and serving to compensate the depression of said piston during the passage of a fluid medium, substantially as described.

In testimony whereof I affix my signature in presence of two witnesses.

HANS FRIEDRICH.

Witnesses:
 J. C. MONAGHAN,
 ANNA MARKIE.